INVENTORS...
DONALD G. HOWELL
CLARENCE F. GRACELY
EUGENE J. VAN KEUREN
BY
MAHONEY, MILLER & RAMBO
BY
ATTORNEYS

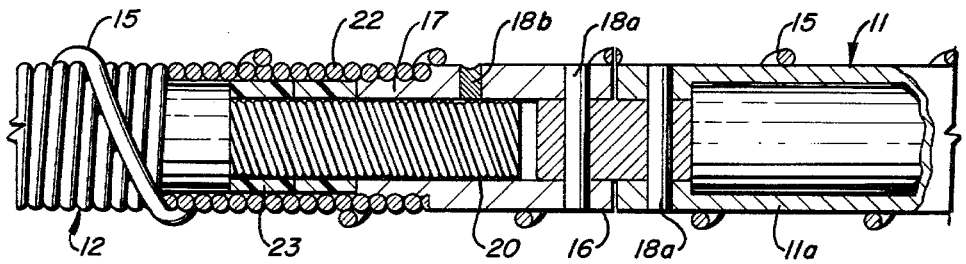
FIG. 4
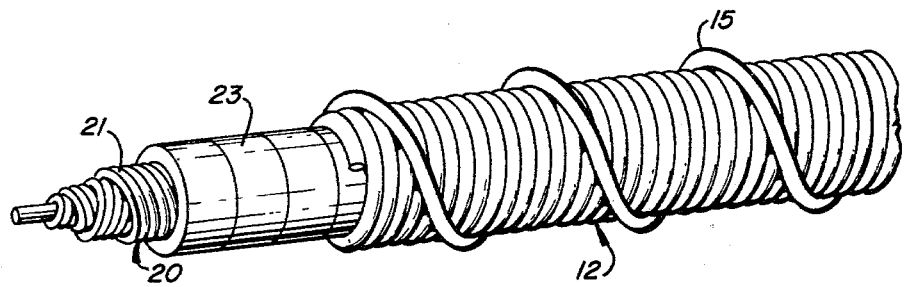
FIG. 5
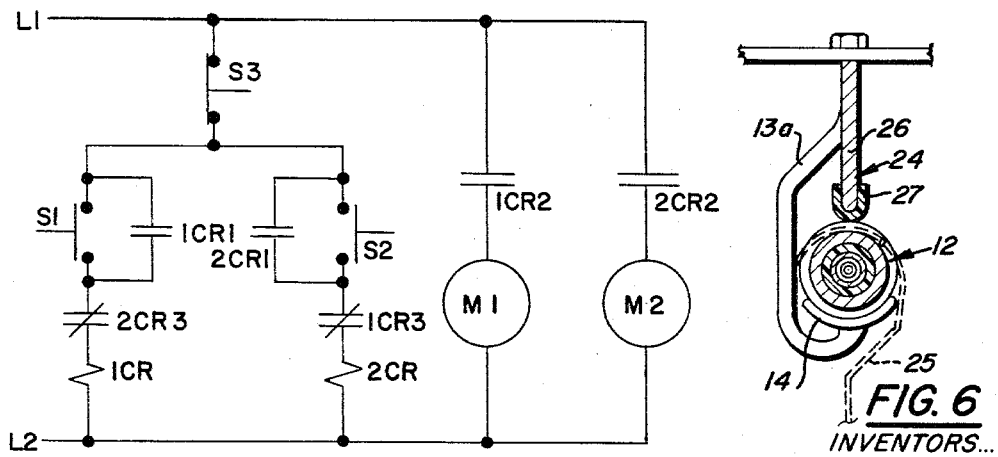
FIG. 7
FIG. 6
INVENTORS...
DONALD G. HOWELL
CLARENCE F. GRACELY
EUGENE J. VAN KEUREN
BY
MAHONEY, MILLER & RAMBO
BY
Wm. V. Miller
ATTORNEYS April 13, 1965  E. J. VAN KEUREN ETAL  3,178,010
CONVEYOR OF THE AXIALLY ROTATABLE RAIL TYPE
Filed March 28, 1963  3 Sheets-Sheet 3
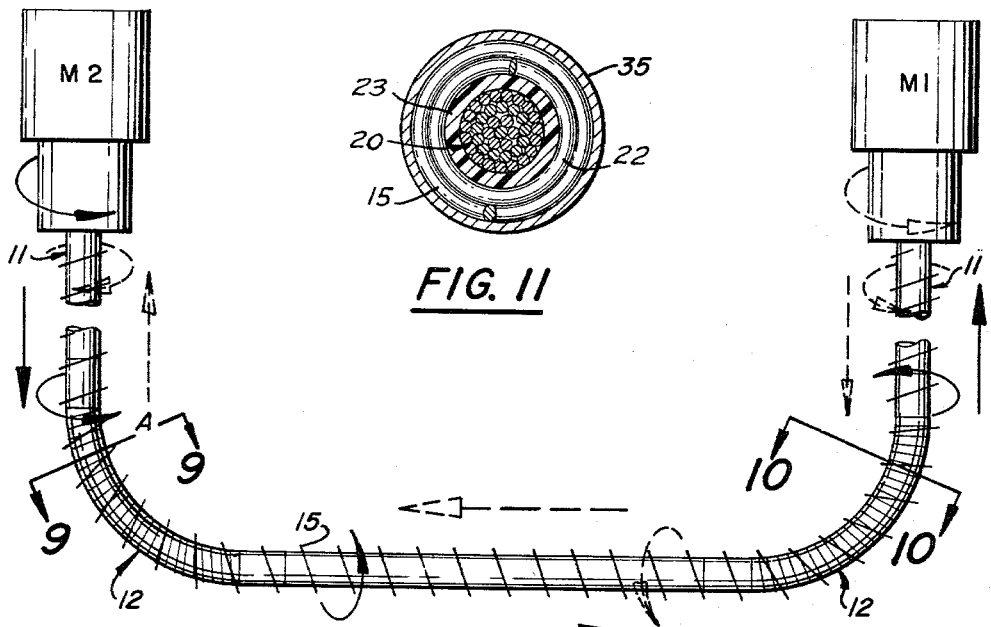
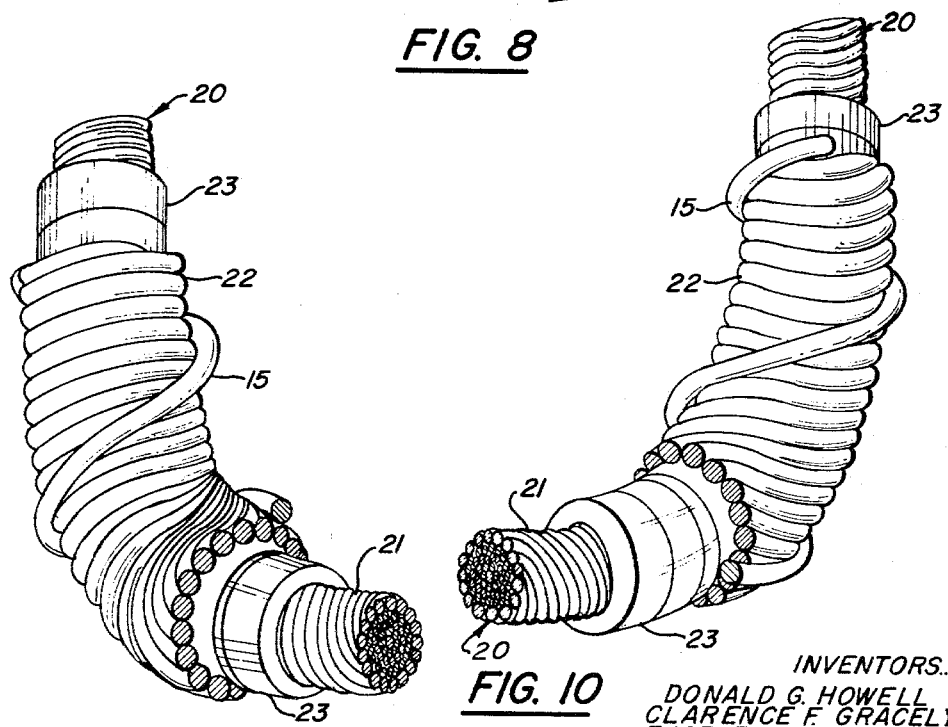
INVENTORS...
DONALD G. HOWELL
CLARENCE F. GRACELY
BY EUGENE J. VAN KEUREN
MAHONEY, MILLER & RAMBO
BY
ATTORNEYS

United States Patent Office 3,178,010
Patented Apr. 13, 1965

3,178,010
CONVEYOR OF THE AXIALLY ROTATABLE
RAIL TYPE
Eugene J. Van Keuren, Donald G. Howell, and Clarence
F. Gracely, Marion, Ohio, assignors to Rotorail, Incorporated, Los Angeles, Calif., a corporation of Ohio
Filed Mar. 28, 1963, Ser. No. 268,798
6 Claims. (Cl. 198—108)

This invention relates to a conveyor of the axially rotatable rail type. It has to do, more particularly, with that type of conveyor which comprises a single axially-rotatable rail or track which has a helix on its outer surface for engaging and moving articles, suspended on the rail, along the rail to selected stations. This general type of conveyor is disclosed in Dahlberg Patents Nos. 2,620,917 of December 9, 1952, and 2,599,615 of June 10, 1952.

The conveyors disclosed in said patents are capable of operation in one direction only to advance the articles they support in one direction longitudinally to a selected station. Such conveyors are usually driven by an electric motor connected to one end of the rail which is supported for rotation about its own axis. Due to the nature of the rail, it is only possible to drive it by a torque force applied in one direction only. Consequently, the motor cannot be driven in one direction to cause the helix on the rail to move the supported articles longitudinally in one direction and then be reversed in its rotation to bring the articles back. The drive cannot be reversed due to the nature of the rail structure which is necessary to have it pass around corners or through angles, which is required in most installations. At each of these corners or angles, a special flexible rail section is necessary to permit curving or bending. This section is of the type disclosed in Patent No. 2,620,917. This flexible section is of cable-like construction and includes a torque applying shaft or cable which has several helical layers or windings with an outer layer wound in a predetermined direction. This direction of winding is so related to the direction of rotation of the drive motor that the torque applied to the rail section by the motor will tend to tighten this winding rather than loosen it. Therefore, the motor must always drive in the same direction and cannot be reversed to cause the rail to return the articles therealong. Consequently, this type of rail conveyor is necessarily a one-way conveyor.

There is a need for a conveyor of this rotatable rail type which can operate in both directions so that articles can be conveyed to a predetermined location therealong where some work or inspection is performed and then be returned to the original starting point. Furthermore, it is desirable that this be accomplished with electric motors of standard design which drive in one direction only.

Various other objects will be apparent as this description progresses.

A preferred embodiment of this invention is illustrated in the accompanying drawings but it is to be understood that specific variations may be made without departing from basic principles.

In these drawings:

FIGURE 4 is an enlarged, vertical sectional view taken along line 4—4 of FIGURE 3 at the coupling between a rigid rail section and a flexible rail section.

FIGURE 5 is a detail in perspective and section of a flexible rail section.

FIGURE 6 is a transverse vertical sectional view showing a rail-suspending bracket provided with a hold-down means.

FIGURE 7 is a diagram of the electric circuit of the system.

FIGURE 8 is a diagrammtic plan view illustrating principles involved in the system.

FIGURE 9 is a diagrammatic perspective view of a portion of one of the curved sections taken at the approximate position indicated by lines 9—9 of FIGURE 8.

FIGURE 10 is a view similar to FIGURE 9 taken at the approximate position indicated by lines 10—10 of FIGURE 8.

FIGURE 11 is a diagrammatic sectional view showing another application of the conveyor.

Figure 1:
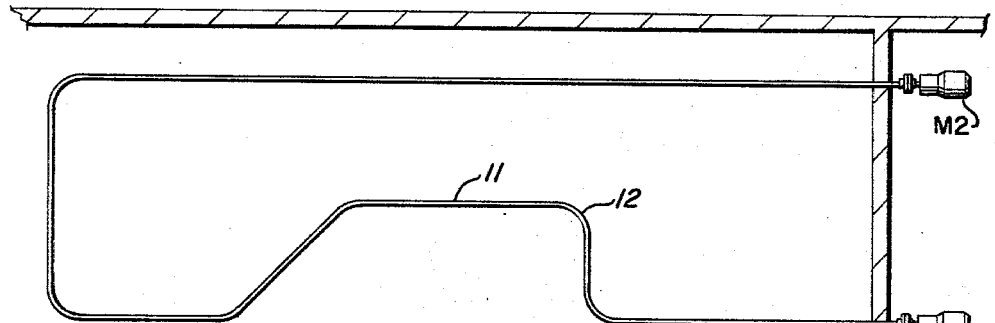
FIGURE 1 is a diagrammatic plan view of a conveyor system embodying this invention.

With reference to the drawings, in FIGURE 1 there is illustrated a rotatable rail conveyor system which insofar as the details of the rail structure is concerned is similar to that disclosed in the Dahlberg patents and especially that disclosed in Patent No. 2,620,917. However, the rail conveyor system disclosed herein comprises a basically different arrangement which can operate to move supported articles in either direction therealong.

The rail of the conveyor may be suspended from a suitable support and may consist of straight rail sections and corner or angular sections. Any desired arrangement may be provided, depending on the particular installation, but in the example shown in FIGURE 1, the rail comprises the straight sections 11 and the curved connecting corner or angular sections 12. As previously indicated, the sections 11 are rigid rail sections and the sections 12 are flexible rail sections. All the rail sections are suspended by suitable hook brackets 13 and 13a (FIGURES 2 and 6, respectively) which include a bolt or stem having a rail-receiving cradle or saddle 14 on its lower end. The modified hooks 13a for suspending the flexible rail sections 12 and alternately suspending the straight rail section 11 include hold-down means 24 which will be described more in detail later. For moving suspended articles along the rail sections, when they are rotated axially, a helical lead wire 15 is wrapped around the sections for the entire extent of the rail. This wire is of separate sections corresponding to the sections 11 and 12, with the two ends of the lead wire on each respective section being secured to that section as by silver-soldering.

The straight rigid sections 11 of the rail may be made of ordinary pipe or tubing 11a of proper size and strength or may be solid rods or of special material, such as stainless steel, chrome-plated steel, etc. for special purposes. As previously indicated, each section 12 is of special cable-like construction. The different sections are coupled axially together by a suitable coupling which may be of the type indicated in FIGURE 4 at 16.

Each flexible rail section 12 is of the structure indicated in FIGURE 4 and comprises an inner core or torque shaft 20 which is made up of a plurality of layers or helical windings which are wound alternately in opposite directions. The outermost winding 21 of this torque shaft 20 extends helically in a predetermined direction. The lead wire 15 winds helically in the same direction as the winding 21 and, on each flexible rail section, the lead wire encircles an outer coil sheath or filler coil 22. The outermost winding 21 of the torque shaft 20 is separated from the filler coil 22 by means of axially abutting bushings or collars 23 which may be of polyethylene or nylon or other suitable material. The ends of the lead wire 15 on each flexible section may be silver-soldered to the adjacent portion of the coupling member 16. Similarly, the lead wire 15 on the rigid straight sections 11 may be silver-soldered at each end to the surface of the pipe 11a.

The coupling 16 (FIGURE 4) embodies a sleeve of the same diameter as the pipe 11a, and which is coupled thereto by a cylindrical connector plug 18 extending a distance into the sleeve and the pipe. The connector plug 18 is keyed at each end to the adjacent end of the sleeve or pipe by any suitable means such as a roll pin 18a extending through aligned openings formed in the respective members to provide a driving connection and maintain the end of the pipe in contacting engagement with the adjacent end of the sleeve. The other end of the sleeve is reduced at 17 and fits within the adjacent end of the filler coil 22, being threaded on its outer surface to receive the end of the coil. The torque shaft 20 extends axially within this end of the coupling sleeve and its outer winding 21 is connected thereto by means of a slug of silver solder 18b which is produced by dropping molten solder into a transverse opening in the coupling sleeve.

Thus, the coupling 16 serves to couple adjacent rail sections 11 and 12 together for simultaneous rotation. The drive for the rail will be through the endmost sections 11. It is necessary to rotate the rail in such a direction that torque applied to the outer winding 21 of each shaft section 20 will tend to wind it tighter rather than unwind it. Thus, if it is a left-hand or counterclockwise winding, the rail must be driven in a clockwise direction and vice versa. Similarly, the lead wire 15 must be wound in the same direction as the outer winding 21 to avoid any tendency to unwind when the shaft section 20 is driven in the proper direction. The outer winding 21 may be in one direction in one installation and in the opposite direction in another installation. In other words, these shafts 20 are commonly made with either a right or left-hand outer winding 21.

Figure 2:
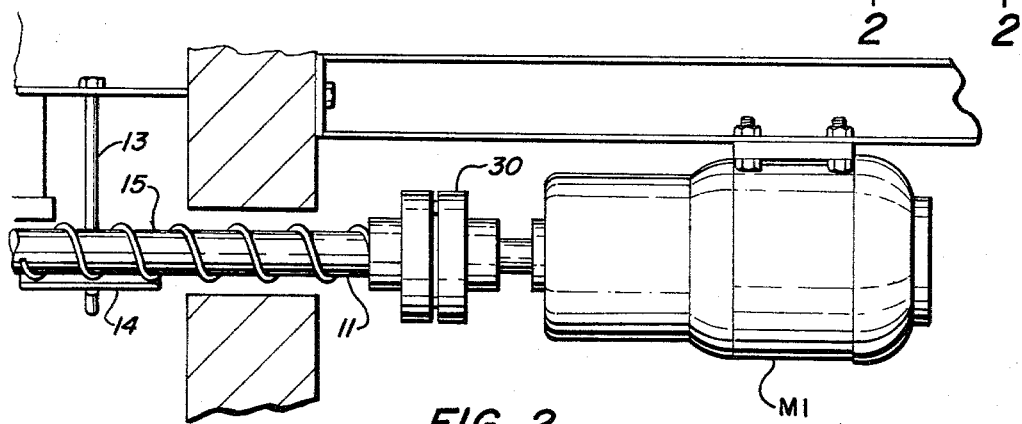
FIGURE 2 is an enlarged, vertical sectional view taken along line 2—2 of FIGURE 1, showing one of the drive motors which is coupled to the rail.
Figure 3:
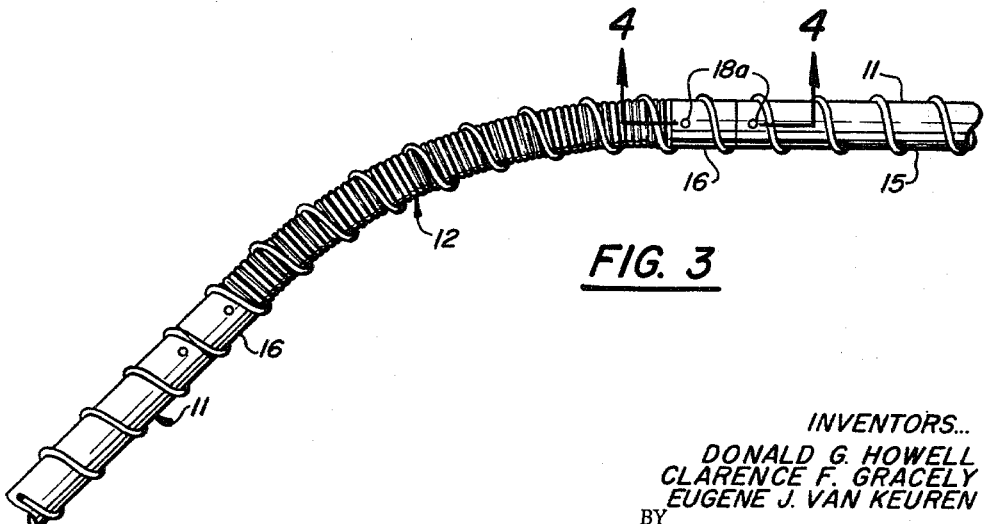
FIGURE 3 is an enlarged plan view showing a flexible, curved rail section coupled to rigid straight sections.

As previously indicated, the rail sections are supported by one or more of the brackets 13 or the modified bracket 13a as best shown in FIGURES 2 and 6, respectively. To assure that the rail sections 11 and 12 will remain on the cradles 14, alternate brackets on each standard length of straight rail section 11 may be of the modified bracket 13a type and each flexible rail section 12 is preferably supported by a modified bracket 13a. In order to prevent any possibility of the rail sections from leaving the cradle 14, the hold-down means 24 is provided. This means will comprise a strip 26 attached to the bolts of the hooks and aligned axially with the cradle 14. It is to be understood in this respect that the cradle 14 would be appropriately curved for the particular application and may be curved either horizontally or vertically or any combination thereof. This strip 26 will have on its lower edge a channel-shaped covering 27 formed from a low friction material, nylon for example, for contacting the exterior surface portions of the lead wire 15. The hold-down means 24 is positioned with the lowermost surface portions of the covering 27 spaced a distance from the cradle 14 slightly greater than the diameter of the rail section but sufficiently close to the rail sections to prevent their climbing over the edges of the cradle as a result of rotational forces. Preferably, the strip 26 extends substantially the entire length of each flexible rail section 12 while the strip for brackets utilized in supporting straight rail sections need only be of relatively short length. The hold-down means 24 may also be utilized with vertically inclined portions of the conveyor rail in installation where it is necessary to transport the article from one floor to another. In such instances, the strip 26 should extend substantially the entire length of the incline.

According to this invention, the rail can be driven in either direction to advance or return the supported articles. This is accomplished without unwinding the outer winding 21 of the shaft 20 of the curved sections 12 by the arrangement shown diagrammatically in FIGURES 1 and 8. The drive is by means of electric motors M1 and M2 driving alternately from opposite ends of the rail. Each of the motors is coupled to the endmost rigid rail section 11 by means of a coupling 30 of a suitable type as indicated in FIGURE 2. Since the motors drive from opposite ends of the rail and both motors drive in the same direction, the direction can be such that regardless of which one is driving, there is no unwinding of the outer winding 21. The principle of this arrangement is illustrated in FIGURES 8, 9 and 10.

In these figures, for simplicity, the rail is shown as having two curved sections. The motor M1 is at one end of the rail and the motor M2 at the other end.

The direction of rail rotation produced by driving with the motor M1 and the direction of movement of the articles along the rail at that time are indicated by the broken arrows in FIGURES 8, 9 and 10. Conversely, the direction of rail rotation produced by driving with the motor M2 and the direction of movement of the articles along the rail at that time are indicated by the full line arrows in FIGURES 8, 9 and 10.

Assuming the winding 21 is in a counterclockwise direction when each shaft 20 is viewed from the end toward the motor M1 and the winding is in a counterclockwise direction when viewed from the end toward the motor M2, it will be apparent that both motors drive in the same direction when viewed from the rear ends of the motors. Thus, each motor, when operated, will drive the shafts 20 in such a direction that the windings 21 thereof will tend to be tightened and not loosened. Furthermore, either motor may be driven so as to rotate the conveyor rail in the desired direction. In the example shown, the motor M1 drives the rail in a counterclockwise direction when viewed from the rear side of the motor and the motor M2 drives it in a counterclockwise direction when viewed from the rear side of the motor. However, since the drive is at opposite ends of the rail, the rail conveyor will be driven by the motor M1 to move the articles longitudinally in the direction of the broken arrows and by the motor M2 to move the articles longitudinally in the opposite direction as indicated by the full-line arrows. This is assuming that the wire 15 is wound in the same direction as the winding 21. Merely reversing a single motor driving from one end of the rail would unwind the winding 21 when the motor was driving in one direction.

It is essential that only one motor be operated at any instant and an electric circuit of the type shown in FIGURE 7 may be provided for insuring this.

The electrically operated motors M1 and M2 for driving the conveyor rail are connected across a pair of power supply lines $L_1$ and $L_2$. The lines $L_1$ and $L_2$ are connected to any power source suitable for operating the motors. A control circuit is provided for manually controlling the operation of the motors, so that they are alternately operable, and includes a pair of electrically-interlocked motor starters. The starters, which are of a conventional design, are connected across the power lines $L_1$ and $L_2$ through a series connected, normally closed, pushbutton type stop switch $S_3$ and each starter controls its respective motor. The starter for motor M1 includes a solenoid coil 1CR for controlling a set of normally open contacts 1CR2 connected in series with motor M1. The coil 1CR is connected in series with a normally open, pushbutton type switch $S_1$. A set of normally open contacts 1CR1 controlled by the coil 1CR are connected across the terminals of switch $S_1$ to form a holding circuit. Also connected in series with the coil 1CR is a set of normally closed contacts 2CR3 controlled by the starter for motor M2. The starter for motor M2 is of a similar design and includes a solenoid coil 2CR for controlling a set of normally open contacts 2CR2 connected in series with motor M2. A start switch $S_2$ is connected in series with the coil 2CR and is provided with a holding circuit consisting of the contacts 2CR1 controlled by the coil 2CR. A set of contacts 1CR3 controlled by the coil 1CR are connected in series with the coil 2CR.

To start either motor M1 or M2, it is only necessary to momentarily actuate the respective start switch $S_1$ or $S_2$, assuming that the stop switch $S_3$ is closed, and energize the associated solenoid coil 1CR or 2CR. Energization of the coil will actuate the associated contacts and energize the motor. If motor M1 is to be started, for example, switch $S_1$ is actuated to close its contacts and complete a circuit to coil 1CR through the closed contacts 2CR3. When coil 1CR is energized, the associated contacts 1CR1 and 1CR2 will close to form a holding circuit and energize motor M1. The contacts 1CR3 which form the electrical interlock with the starter for motor M2 will be opened and thereby prevent operation of the starter for motor M2 until motor M1 has been stopped. Motor M1 may be stopped by simply actuating the stop switch $S_3$ to disconnect the control circuit from the line and deenergize coil 1CR. Contacts 1CR1 and 1CR2 will open and contact 1CR3 will close. Thereafter, motor M2 may be started by actuating switch $S_2$ which will energize coil 2CR through the now closed contacts 1CR3.

In the preceding description, it has been specified that articles are suspended from the conveyor rail by means of hooks, such as the hook 25 shown in FIGURE 6. However, if the nature of the articles to be conveyed is such that they may be hung directly on the conveyor rail, this may be done, or two conveyor rails may be disposed side-by-side for conveying articles supported transversely thereon. Also, the conveyor rail may be used as an auger type conveyor, in which case part or all of it could be enclosed, such as by the tube 35 shown in FIGURE 11.

It will be apparent that this invention provides a rotatable rail conveyor system having the curved flexible cable-like sections which can be driven in either direction without harm to such sections. The drive is accomplished by having the motors drive from opposite ends of the rail so that even though the motors turn in the same direction, the rail is rotated in opposite directions.

Various other advantages will be apparent.

Having thus described this invention, what is claimed is:

1. An axially rotatable rail-type conveyor comprising a rail mounted for rotation about its axis and having a lead helix extending therearound along its length, at least one flexible section included in said rail, comprised of a flexible torque shaft, including an outer helical wire winding, and selectively operable rotary drive units coupled to opposite ends of said rail, each of said drive units being rotatable in a direction to rotate the rail oppositely to the turn direction of said outer helical wire winding in the direction away from said drive unit in order to keep said winding tight.

2. A conveyor according to claim 1 in which said driving units are electric motors having their drive shafts extending inwardly from opposite ends of said rail toward each other.

3. A conveyor according to claim 2 including an electric circuit for controlling said motors, said circuit including means for energizing one motor and deenergizing the other and vice versa.

4. A conveyor according to claim 1 in which each of said flexible rail sections is curved and carries the lead helix, and means cooperating with the helix and extending over it to keep articles in engagement therewith.

5. A conveyor according to claim 4 in which said means includes a low friction contact strip.

6. A conveyor according to claim 1 in which said lead helix is wound in the same direction as the outer helical winding of said torque shaft.

References Cited by the Examiner
UNITED STATES PATENTS

| | | | |
|---|---|---|---|
| 769,947 | 9/04 | Kramer | 198—110 |
| 1,098,873 | 6/14 | Allen | 198—217 |
| 2,987,170 | 6/61 | Hamilton | 198—213 |

SAMUEL F. COLEMAN, *Acting Primary Examiner.*

ERNEST A. FALLER, JR., *Examiner.*